(12) United States Patent
Feng

(10) Patent No.: US 11,166,187 B2
(45) Date of Patent: Nov. 2, 2021

(54) SERVICE BEARER CONGESTION CONTROL METHOD AND DEVICE

(71) Applicant: GUANGDONG OPPO MOBILE TELECOMMUNICATIONS CORP., LTD., Guangdong (CN)

(72) Inventor: Bin Feng, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 117 days.

(21) Appl. No.: 15/745,936

(22) PCT Filed: Sep. 30, 2015

(86) PCT No.: PCT/CN2015/091256
§ 371 (c)(1),
(2) Date: Jan. 18, 2018

(87) PCT Pub. No.: WO2017/054183
PCT Pub. Date: Apr. 6, 2017

(65) Prior Publication Data
US 2018/0295539 A1    Oct. 11, 2018

(51) Int. Cl.
*H04W 28/02* (2009.01)
*H04W 48/02* (2009.01)

(52) U.S. Cl.
CPC ... *H04W 28/0252* (2013.01); *H04W 28/0289* (2013.01); *H04W 48/02* (2013.01)

(58) Field of Classification Search
CPC ............................................... H04W 28/0252
See application file for complete search history.

(56) References Cited

U.S. PATENT DOCUMENTS 8,837,443 B2 *   9/2014   Yamada ............... H04W 28/10
                                                                    370/338
9,237,557 B2    1/2016   Lee et al.
(Continued)

FOREIGN PATENT DOCUMENTS

CN            1674544 A      9/2005
CN          101742555 A      6/2010
(Continued)

OTHER PUBLICATIONS

First Office Action of the Japan application No. 2018-507583, dated Jun. 28, 2019.
(Continued)

Primary Examiner — Jae Y Lee
Assistant Examiner — Andrew C Lee

(57) ABSTRACT

A service category congestion control method and device are provided. The method includes that: service request information is acquired, the service request information including information corresponding to a request for establishing a bearer of a target service initiated by a terminal in a connected mode and the service request information including a service category of the target service; service category barring information is acquired, the service category barring information including a barring parameter corresponding to the service category of the target service in the connected mode; and whether the terminal is barred from establishing the bearer of the target service belonging to the service category is judged according to the barring parameter.

12 Claims, 7 Drawing Sheets

(56) References Cited

U.S. PATENT DOCUMENTS

| | | | |
|---|---|---|---|
| 9,357,568 B2 * | 5/2016 | Al-Shalash | H04W 76/10 |
| 9,426,698 B2 * | 8/2016 | Watfa | H04W 28/0289 |
| 9,538,540 B2 * | 1/2017 | Hsu | H04W 48/02 |
| 2013/0040597 A1 | 2/2013 | Jang | |
| 2014/0010180 A1 | 1/2014 | Lee et al. | |
| 2014/0029530 A1 * | 1/2014 | Kim | H04W 48/02 370/329 |
| 2014/0269279 A1 * | 9/2014 | Ismail | H04W 28/0289 370/230 |
| 2015/0036489 A1 | 2/2015 | Rajadurai et al. | |
| 2015/0064080 A1 | 3/2015 | Skakoon | |
| 2015/0109910 A1 | 4/2015 | Hurd | |
| 2015/0117213 A1 | 4/2015 | Pinheiro | |
| 2015/0126147 A1 * | 5/2015 | Koskela | H04W 48/04 455/404.1 |
| 2015/0230199 A1 | 8/2015 | Jeong et al. | |
| 2015/0249951 A1 | 9/2015 | Jung et al. | |
| 2015/0257088 A1 | 9/2015 | Hsu et al. | |
| 2015/0257161 A1 * | 9/2015 | Hsu | H04L 65/80 455/453 |
| 2016/0212653 A1 | 7/2016 | Wang et al. | |
| 2016/0219493 A1 * | 7/2016 | Kim | H04W 4/60 |
| 2016/0227469 A1 * | 8/2016 | Kim | H04W 4/14 |
| 2016/0278096 A1 * | 9/2016 | Watfa | H04W 28/12 |
| 2017/0013501 A1 * | 1/2017 | Kim | H04W 48/06 |
| 2017/0257791 A1 | 9/2017 | Rajadurai et al. | |
| 2017/0273007 A1 * | 9/2017 | Jung | H04W 48/06 |
| 2019/0098634 A1 | 3/2019 | Watfa et al. | |

FOREIGN PATENT DOCUMENTS

| | | |
|---|---|---|
| CN | 102170659 A | 8/2011 |
| CN | 102469520 A | 5/2012 |
| CN | 102638848 A | 8/2012 |
| CN | 102761933 A | 10/2012 |
| CN | 102857969 A | 1/2013 |
| CN | 103220750 A | 7/2013 |
| CN | 103228039 A | 7/2013 |
| CN | 103857005 A | 6/2014 |
| CN | 104427574 A | 3/2015 |
| CN | 104737590 A | 6/2015 |
| CN | 104811900 A | 7/2015 |
| CN | 104811909 A | 7/2015 |
| JP | 2015-029344 A | 2/2015 |
| KR | 20140140595 A | 12/2014 |
| RU | 2443080 C2 | 2/2012 |
| WO | 2013141600 A1 | 9/2013 |
| WO | 2015031202 A1 | 3/2015 |
| WO | 2015066383 A1 | 5/2015 |
| WO | 2015131851 A1 | 9/2015 |
| WO | 2016003140 A1 | 1/2016 |

OTHER PUBLICATIONS

International Search Report in international application No. PCT/CN2015/091256, dated Jul. 7, 2016.
Written Opinion of the International Search Authority in international application No. PCT/CN2015/091256, dated Jul. 7, 2016.
Supplementary European Search Report in European application No. 15905095.4, dated Dec. 14, 2018.
English Translation of the Written Opinion of the International Search Authority in international application No. PCT/CN2015/091256, dated Jul. 7, 2016.
Huawei, HiSilicon, Possible solutions for congestion mitigation in RRC_CONNECTED [online], 3GPP TSG-RAN WG2#83bis R2-133284, Oct. 11, 2013.
NTT Docomo, Inc., The necessity of access control in RRC_CONNECTED [online], 3GPP TSG-RAN WG2#79bis R2-124412, Oct. 12, 2012.
BlackBerry UK Limited, Prioritisation of mobile originating access during congestion [online], 3GPP TSG-RAN WG2#83bis R2-133404, Oct. 11, 2013.
NTT Docomo, Inc., The necessity of access control for IMS voice/video from UE in RRC Connected mode [online], 3GPP TSG-RAN WG2#79 R2-123674, Aug. 17, 2012.
Second Office Action of the Japanese application No. 2018-507583, dated Feb. 21, 2020.
Written Opinion of the Singaporean application No. 11201801165U, dated Mar. 19, 2020.
Office Action of the Australian application No. 2015411026, dated Mar. 2, 2020.
First Office Action of the Chinese application No. 201580081247.3, dated May 12, 2020.
First Office Action of the European application No. 15905095.4, dated Mar. 31, 2020.
Second Office Action of the Australian application No. 2015411026, dated May 27, 2020.
First Office Action of the Indian application No. 201817015444, dated Jun. 9, 2020.
First Office Action of the Chilean application No. 201800724, dated Dec. 13, 2018.
First Office Action of the Russian application No. 2018113474, dated Mar. 28, 2019.
First Office Action of the Israeli application No. 257427, dated Dec. 9, 2019.
First Office Action of the Canadian application No. 2996178, dated Nov. 30, 2018.
First Office Action of the Singaporean application No. 11201801165U, dated May 8, 2019.
First Office Action of the Brazilian application No. BR1120180055123, dated Sep. 15, 2020.
3GPP TR 22.806 V1.0.0 (Feb. 2014); 3rd Generation Partnership Project; Technical Specification Group Services and System Aspects; Study on Application specific Congestion control for Data Communication (Release 13) Feb. 25, 2014.
Zhou Wei, Research on Congestion Control of Random Access Channel in Machine Type Communications; China Excellent Master thesis electronic journal network; Jan. 31, 2015.
Notice of Allowance of the Chinese application No. 201580081247.3, dated Sep. 25, 2020.
Second Office Action of the Israeli application No. 257427, dated Aug. 27, 2020.
LG Electronics, ACDC impacts on AS layer, 3GPP TSG-RAN WG2 #91 R2-153244, Beijing, China, Aug. 24-28, 2015.
LG Electronics Inc. [To be TSG-RAN WG2], [DRAFT] Reply LS on ACDC mechanism, 3GPP TSG RAN WG2 Meeting #91 R2-153858, Beijing, China, Aug. 24-28, 2015.
Decision of Rejection of the Japanese application No. 2018-507583, dated Oct. 23, 2020.
First Office Action of the Mexican application No. MX/a/2018/003712, dated Oct. 22, 2020.
Supplementary European Search Report in the European application No. 21155285.6, dated May 12, 2021.
First Office Action of the Malaysian application No. PI2018701156, dated May 29, 2021.
First Office Action of the Korean application No. 10-2018-7004246, dated Jul. 29, 2021.

* cited by examiner

SERVICE BEARER CONGESTION CONTROL METHOD AND DEVICE

RELATED APPLICATION

This application is an application under 35 U.S.C. 371 of International Application No. PCT/CN2015/091256 filed on Sep. 30, 2015, the entire contents of which are incorporated herein by reference.

TECHNICAL FIELD

Embodiments of the disclosure relates to the field of communications, and particularly to a service bearer congestion control method and device.

BACKGROUND

At present, along with rapid development of the wireless communication technology, data services explosively grow. Rapid growth of data services may cause congestion of an access network and core network in wireless communication. For solving the problem of congestion, it is being discussed in current wireless communication that random access priorities are set for part of data services of a terminal by a system in advance to enable the terminal in an idle mode to automatically make a judgment when initiating a service establishment flow and then initiate random access and the subsequent service establishment flow under the condition that the access is judged to be allowed.

For example, in a Long Term Evolution (LTE) system, an access control mechanism such as Access Class Barring (ACB) is introduced from Release 8 (R8). In an R8 system, service categories may include a Mobile Originated-data (MO-data) service, an MO-signaling service, a Mobile Terminated-data (MT-data) service, a high priority service (usually reserved by an operator), an emergency service and the like. Different categories of services correspond to different priorities.

When a terminal is notified, in a broadcast system message, to initiate random access in an idle mode, an access network device (such as a base station) needs to determine an access control service category and a corresponding access control parameter. Here, different access control parameters may be set for different categories of services according to different priorities. In order to initiate a service request, the terminal in the idle mode determines whether the service request is barred according to a service category and a corresponding access control parameter. When the service request is barred, random access and a subsequent service establishment flow will not be performed, so that a congestion condition of an access network or a core network may be alleviated.

However, the abovementioned access control mechanism is for the terminal in the idle mode, namely for first initiation of the service request of the terminal. In a current mechanism, a terminal may access a network through a high-priority service request and then initiate a low-priority service request. This is because the terminal has been in a connected mode in the network at this moment, does not have to initiate flows of random access, service establishment request and the like, and thus may directly apply for addition of a new bearer. In this case, there may be unfairness between the low-priority service request initiated by the terminal in the connected mode and a low-priority service request directly initiated by another terminal in the idle mode.

SUMMARY

The embodiments of the disclosure provide a service category congestion control method and device, which may control bearer establishment of a terminal in a connected mode, thereby implementing a congestion control mechanism fair to each terminal.

A first aspect provides a service category congestion control method, which may include that: service request information is acquired, the service request information including information corresponding to a request for establishing a bearer of a target service initiated by a terminal in a connected mode and the service request information including a service category of the target service; service category barring information is acquired, the service category barring information including a barring parameter corresponding to the service category of the target service in the connected mode; and whether the terminal is barred from establishing the bearer of the target service of the service category is judged according to the barring parameter.

A second aspect provides a service category congestion control method, which may include that: service request information is sent, the service request information including information corresponding to a request for establishing a bearer of a target service initiated by a terminal in a connected mode and the service request information including a service category of the target service; and indication information indicating that the terminal is barred from establishing or allowed to establish the bearer of the target service of the service category is received.

A third aspect provides a service category congestion control method, which may include that: a service request sent by a Non-Access Stratum (NAS) of a terminal is received, the service request being a request for establishing a bearer of a target service initiated by the terminal in a connected mode and the service request including a service category of the target service; and service request information is sent to an access network device, the service request information being configured to notify the access network device that the NAS of the terminal sends the service request to a core network device and the service request information including the service category of the target service.

A fourth aspect provides a service category congestion control method, which may include that: when an access network device determines that a terminal is allowed to establish a bearer of a target service, a core network device receives indication information indicating that establishment of the bearer of the target service is allowed from the access network device.

A fifth aspect provides a service category congestion control method, which may include that: an access network device sends service category barring information to a core network device, the service category barring information including a barring parameter corresponding to a service category of a target service in a connected mode; and when the core network device determines that a terminal is allowed to establish a bearer of the target service, the access network device receives indication information indicating that establishment of the bearer of the target service is allowed from the core network device.

A sixth aspect provides service category congestion control device, which may include: an acquisition module, configured to acquire service request information, the service request information including information corresponding to a request for establishing a bearer of a target service initiated by a terminal in a connected mode and the service request information including a service category of the target service; the acquisition module being further configured to acquire service category barring information, the service category barring information including a barring parameter corresponding to the service category of the target service in the connected mode; and a judgment module, configured to judge whether the terminal is barred from establishing the bearer of the target service of the service category according to the barring parameter.

A seventh aspect provides a service category congestion control terminal, which may include: a sending module, configured to send service request information, the service request information including information corresponding to a request for establishing a bearer of a target service initiated by a terminal in a connected mode and the service request information including a service category of the target service; and a receiving module, configured to receive indication information indicating that the terminal is barred from establishing or allowed to establish the bearer of the target service of the service category.

An eighth aspect provides service category congestion control core network device, which may include: a receiving module, configured to receive a service request sent by a NAS of a terminal, the service request being a request for establishing a bearer of a target service initiated by the terminal in a connected mode and the service request including a service category of the target service; and a sending module, configured to send service request information to an access network device, the service request information being configured to notify the access network device that the NAS of the terminal sends the service request to the core network device and the service request information including the service category of the target service.

A ninth aspect provides service category congestion control core network device, which may include: a receiving module, configured to, when an access network device determines that a terminal is allowed to establish a bearer of a target service, receive indication information indicating that establishment of the bearer of the target service is allowed from the access network device.

A tenth aspect provides service category congestion control access network device, which may include: a sending module, configured to send service category barring information to a core network device, the service category barring information including a barring parameter corresponding to a service category of a target service in a connected mode; and a receiving module, configured to, when the core network device determines that a terminal is allowed to establish a bearer of the target service, receive indication information indicating that establishment of the bearer of the target service is allowed from the core network device.

According to the service category congestion control method and device of the embodiments of the disclosure, based on the technical solutions, controlling bearer establishment of the terminal in the connected mode according to the barring parameter may effectively solve the problem of unfairness between a low-priority service request initiated by the terminal which accesses a network through a high-priority service request and a low-priority service request directly initiated by another terminal in an idle mode, thereby implementing a congestion control mechanism fair to each terminal.

BRIEF DESCRIPTION OF DRAWINGS

In order to describe the technical solutions of the embodiments of the disclosure more clearly, the drawings required to be used for descriptions about the embodiments or the embodiments or a conventional art will be simply introduced below. Obviously, the drawings described below are only some embodiments of the disclosure. For those skilled in the art, other drawings may further be obtained according to these drawings without creative work.

DETAILED DESCRIPTION

Figure 1:
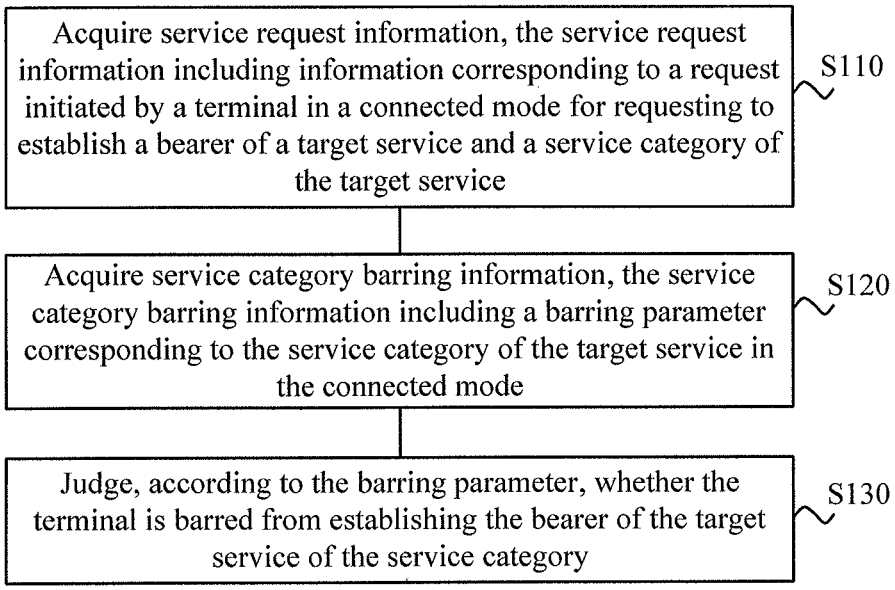
FIG. 1 illustrates a schematic flowchart of a service category congestion control method according to an embodiment of the disclosure.

The technical solutions in the embodiments of the disclosure will be clearly and completely described below in combination with the drawings in the embodiments of the disclosure. Obviously, the described embodiments are not all embodiments but part of embodiments of the disclosure. All other embodiments obtained by those skilled in the art on the basis of the embodiments in the disclosure without creative work fall within the scope of protection of the disclosure.

Terms "part", "module", "system" and the like used in the specification are adopted to represent an entity, hardware, firmware, combination of hardware and software, software or software in execution related to a computer. For example, a part may be, but not limited to, a process running on a processor, the processor, an object, an executable file, an execution thread, a program and/or a computer. It is graphically represented that all applications running on computing device and the computing device may be parts. One or more parts may reside in a process and/or an execution thread, and the parts may be located on a computer and/or distributed between two or more computers. In addition, these parts may be executed from various computer-readable media on which various data structures are stored. The parts may communicate through local and/or remote processes according to, for example, signals with one or more data groups (for example, data from two parts interacting with each other in a local system, a distributed system and/or a network, for example, the Internet interacting with another system through a signal).

It is to be understood that the technical solutions of the embodiments of the disclosure may be applied to various communication systems, for example: a Global System of Mobile Communication (GSM), a Code Division Multiple Access (CDMA) system, a Wideband Code Division Multiple Access (WCDMA) General Packet Radio Service (GPRS) system, an LTE system, an LTE Frequency Division Duplex (FDD) system, LTE Time Division Duplex (TDD), a Universal Mobile Telecommunication System (UMTS), a Worldwide Interoperability for Microwave Access (WiMAX) communication system and a future 5th-Generation (5G) communication system.

Each embodiment is described in the disclosure in combination with a terminal. The terminal may communicate with one or more core networks through a Radio Access Network (RAN), and the terminal may be a User Equipment (UE), an access terminal, a user unit, a subscriber station, a mobile radio station, a mobile station, a remote station, a remote terminal, mobile device, a user terminal, a terminal, wireless communication device, a user agent or a user device. The access terminal may be a cellular telephone, a cordless telephone, a Session Initiation Protocol (SIP) telephone, a Wireless Local Loop (WLL) station, a Personal Digital Assistant (PDA), handheld device with a wireless communication function, computing device, or other processing device connected to a wireless modem, vehicle-mounted device, wearable device, a terminal in a future 5G network and the like.

Each embodiment is described in the disclosure in combination with an access network device. The access network device may be device configured to communicate with a terminal in an access network, and for example, may be a Base Transceiver Station ("BTS") in a GSM or CDMA, may also be a NodeB ("NB") in a WCDMA system, and may further be an Evolutional Node B ("eNB" or "eNodeB") in an LTE system. Or, the network device may be a relay station, an access point, vehicle-mounted device, wearable device, network-side device in the future 5G network and the like.

Each embodiment is described in the disclosure in combination with a core network device. The core network device is mainly configured to provide a user connection, manage a user, implement bearing of service, provide an interface to an external network as a bearer network and the like, and may be, for example, a Mobility Management Entity (MME), or another network element in a core network.

FIG. 1 illustrates a schematic flowchart of a service category congestion control method 100 according to an embodiment of the disclosure. It is to be understood that the method 100 may be executed by a terminal, or may be executed by an access network device, for example, a base station, or may be executed by a core network device, for example, an MME. The method 100 includes the following operations.

In S110, service request information is acquired, the service request information including information corresponding to a request for establishing a bearer of a target service initiated by a terminal in a connected mode and the service request information including a service category of the target service.

In S120, service category barring information is acquired, the service category barring information including a barring parameter corresponding to the service category of the target service in the connected mode.

In S130, it is judged whether the terminal is barred from establishing the bearer of the target service of the service category according to the barring parameter.

According to the service category congestion control method of the embodiment of the disclosure, controlling bearer establishment of the terminal in the connected mode according to the barring parameter may effectively solve the problem of unfairness between a low-priority service request initiated by the terminal which accesses a network through a high-priority service request and a low-priority service request directly initiated by another terminal in an idle mode, thereby implementing a congestion control mechanism fair to each terminal.

Herein, according to different executive subjects of the method 100, the service request information in S110 may be sent to an Access Stratum (AS) of the terminal by a NAS of the terminal, or may be notified to an access network device by a core network device after the NAS of the terminal sends a service request to the core network device, or may be sent to the access network device by the AS of the terminal, or may be sent to the core network device by the NAS of the terminal. The service request is a request for establishing the bearer of the target service initiated by the terminal in the connected mode, and the service request includes the service category of the target service. It is to be understood that multiple services may be of the same service category.

The terminal being in the idle mode means that the terminal does not establish any connection with a network side (including an access network and a core network) and the terminal does not bear any service. The terminal being in the connected mode means that the terminal has established a connection with the network side (including the access network and the core network) through a signaling flow.

The service category barring information in S120 is usually determined and generated by the access network device according to a condition of a data service born by a current network, usually includes multiple service categories in the connected mode and a barring parameter corresponding to each service category, and is sent to the terminal and/or the core network device by the access network device in a broadcast or unicast form.

In S130, it is judge whether the terminal is allowed to establish the bearer of the target service according to the barring parameter corresponding to the service category of the target service. Herein, whether establishment of the bearer of the target service is allowed may be judged in multiple manners.

Alternatively, as an embodiment, the barring parameter is a barring probability, and the method 100 may further include that: a random number generated by the terminal for the target service is acquired; and the operation of judging whether the terminal is barred from establishing the bearer of the target service of the service category according to the barring parameter in S130 may include that: when the random number is smaller than the barring probability, the terminal is barred from establishing the bearer of the target service, and when the random number is larger than the barring probability, the terminal is allowed to establish the bearer of the target service.

Specifically, the access network device may set different barring probabilities (for example, $P_1, P_2, \ldots, P_n$) for different service categories (for example, $S_1, S_2, \ldots, S_n$) according to the condition of the data service born by the current network. The barring probabilities ($P_1, P_2, \ldots, P_n$) are configured to judge whether the terminal in the connected mode is to be barred from establishing the service bearer.

When the terminal in the connected mode requests establishing the service bearer, a random number between 0 and 1 is generated for the target service, and the random number is sent to an executive subject of the method 100. Herein, the random number may be contained in the service request information for sending, or may be independently sent, which will not be limited in the embodiment of the disclosure.

The executive subject of the method 100 finds the corresponding barring probability $P_i$ according to the service category (for example, $S_i$) of the target service requested by the terminal in the connected mode, compares the random number with the barring probability $P_i$, bars the terminal from establishing the bearer of the target service when the random number is smaller than the barring probability $P_i$, and allows the terminal to establish the bearer of the target service when the random number is larger than the barring probability $P_i$.

It is to be understood that processing under the condition that the random number is equal to the barring probability $P_i$ may be consistent with processing when the random number is smaller than the barring probability $P_i$, or may be consistent with processing when the random number is larger than the barring probability $P_i$. For example, when the random number is smaller than or equal to the barring probability $P_i$ (the random number≤$P_i$), the terminal is barred from establishing the bearer of the target service; and when the random number is larger than the barring probability $P_i$ (the random number>$P_i$), the terminal is allowed to establish the bearer of the target service. Or, when the random number is smaller than the barring probability $P_i$ (the random number<$P_i$), the terminal is barred from establishing the bearer of the target service; and when the random number is larger than or equal to the barring probability $P_i$ (the random number≥$P_i$), the terminal is allowed to establish the bearer of the target service. There are no limits made in the embodiment of the disclosure.

If the service request is barred, the terminal may select a random number between 0 and 1 again for service requesting after a certain period of time, where the time may be called as a service category barring time. The service category barring time may be calculated according to the following calculation formula (1):

$$T\text{barring} = (0.7 + 0.6 \times \text{random number}) \times ac\text{-BarringTime} \quad (1),$$

where ac-BarringTime is an access barring time configured by the access network device.

In the embodiment of the disclosure, the barring probability may be lower than an access barring probability corresponding to the service category of the target service in the idle mode.

For example, the terminal initiates a service request of a service category $S_j$ in the idle mode, and the service category $S_j$ corresponds to an access barring probability $p_j$ in the idle mode. Then the terminal is in the connected mode, the terminal initiates a service request of a service category $S_i$ in the connected mode, and the service category $S_i$ corresponds to an access barring probability $p_i$ in the idle mode. Since the terminal has established a connection with the access network device by multiple interactions when initiating the service request of the service category $S_j$ before, the terminal is in the connected mode at this moment, and consumption in signaling during service bearer establishment is far lower than that in the idle mode. Therefore, the access network device may set a barring probability $P_i$ in the connected mode, $P_i$ being smaller than $p_i$. Of course, $P_i$ may also be set to be equal to $p_i$ in the embodiment of the disclosure, specific parameters may be configured by an operator, and there are no limits made in the embodiment of the disclosure.

It is to be understood that the access network device may generate the barring probability of the service category in the connected mode by multiplying the access barring probability of the service category in the idle mode by a service category access probability used by the terminal in the idle mode, or generate the barring probability of the service category in the connected mode by multiplying the access barring probability of the service category in the idle mode by a coefficient larger than 0 and smaller than 1, or directly reuses the access barring probability of the service category in the idle mode as the barring probability of the service category in the connected mode, or the access network device independently defines the barring probability of the service category in the connected mode. There are no limits made in the embodiment of the disclosure.

Alternatively, as another embodiment, the barring parameter is a barring bitmap, and the method 100 may further include that: an Access Class (AC) of the terminal is acquired; and the operation that whether the terminal is barred from establishing the bearer of the target service of the service category is judged according to the barring parameter in S130 may include that: when the AC of the terminal is set to be 1 in the barring bitmap, the terminal is barred from establishing the bearer of the target service; or when the AC of the terminal is not set to be 1 in the barring bitmap, the terminal is allowed to establish the bearer of the target service.

Specifically, when each terminal accesses the access network, an AC may be randomly allocated to it. For example, the ACs may be set to have totally 10 classes, 0-9 respectively, and the AC randomly allocated to a certain terminal is 5.

The access network device may set different barring bitmaps for different service categories according to the condition of the data service born by the current network. For example, the barring bitmap includes 10 classes, and the specific classes to be barred and specific classes to be allowed are indicated in a bit indication manner. Since the AC of the terminal is randomly allocated by the access network device, barring of a certain probability may also be implemented. For example, when the network is to bar 20% of the terminals from establish service bearers, two classes are randomly selected to be set to be 1 in the barring bitmap, and in a specific example, classes 3 and 5 are set to be 1 the barring bitmap. Then, the terminals correspond to ACs 3 and 5 may be barred from establishing service bearers even though having service requests.

Preferably, based on the same reason, mentioned above, why $P_i$ may be smaller than $p_i$, a number of bits set to be 1 in the barring bitmap may be smaller than a number of bits set to be 1 in a bitmap corresponding to the service category of the target service in the idle mode.

It is to be understood that the access network device may set more bits set to be 1 to generate the barring bitmap of the service category in the connected mode according to the bitmap used by the terminal in the idle mode, or directly reuse the bitmap of the service category in the idle mode as the barring bitmap of the service category in the connected mode, or the access network device independently defines the barring bitmap of the service category in the connected mode. There are no limits made in the embodiment of the disclosure.

A service category congestion control mechanism of the embodiment of the disclosure is described above in detail. A service category congestion control signaling flow of the embodiment of the disclosure will be described below in detail in combination with four specific examples.

In an example, the method 100 is executed by the AS of the terminal, that is, the executive subject of the method 100 is the AS of the terminal. The operation of acquiring the service request information in S110 includes that: the service request information sent by the NAS of the terminal is received. The operation of acquiring the service category barring information in S120 includes that: the service category barring information broadcast by the access network device is received, the service category barring information including multiple service categories and barring parameters corresponding to the multiple service categories respectively.

In the embodiment of the disclosure, the method 100 may further include that: when it is determined that the terminal is barred from establishing the bearer of the target service according to the barring parameter, the AS sends first indication information indicating that establishment of the bearer of the target service is barred to the NAS.

Or, in the embodiment of the disclosure, the method 100 may further include that: when it is determined that the terminal is allowed to establish the bearer of the target service according to the barring parameter, the AS sends second indication information indicating that the bearer of the target service is allowed to be established to the NAS, and the AS initiates a flow of establishing the bearer of the target service to the access network device.

Figure 2:
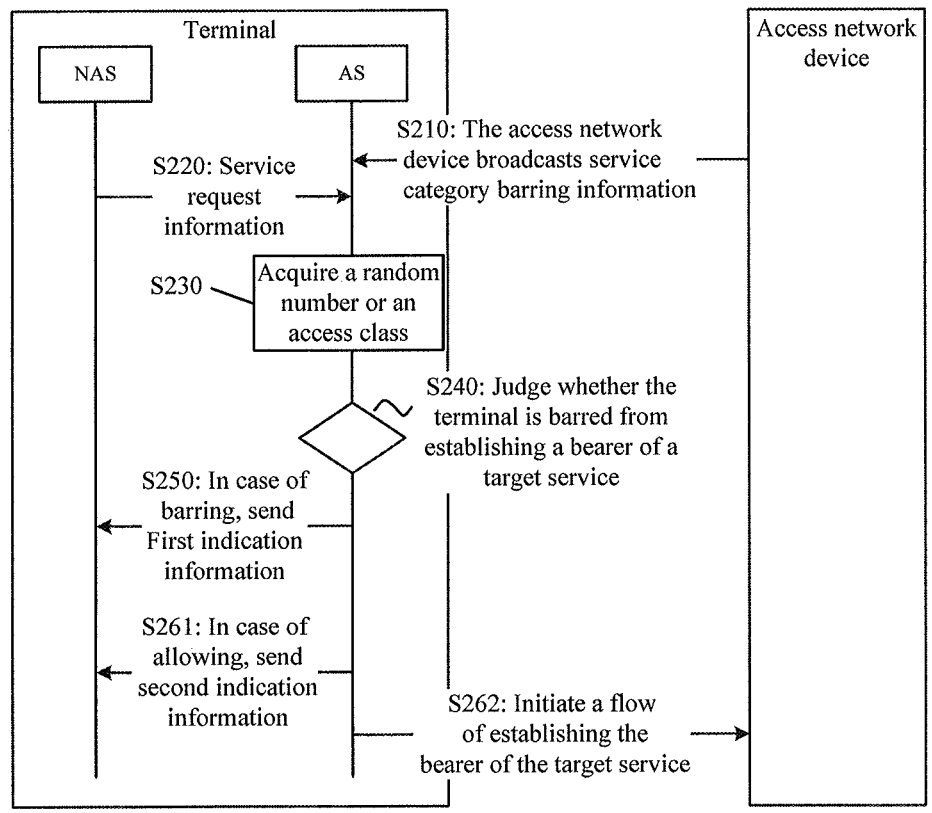
FIG. 2 illustrates a schematic flowchart of a service category congestion control method according to another embodiment of the disclosure.

FIG. 2 illustrates a schematic flowchart of a service category congestion control method 200 according to an embodiment of the disclosure. The method 200 includes the following operations.

In S210, an AS of a terminal receives service category barring information broadcast by an access network device, the service category barring information including multiple service categories and a barring parameter, for example, a barring probability or a barring bitmap, corresponding to each service category in a connected mode. Of course, the access network device in S210 may also broadcast access barring information (for example, an access barring probability or an AC bitmap) in an idle mode together to terminals to execute congestion control on the terminals in the idle mode, which will not be limited in the embodiment of the disclosure.

In S220, a NAS of the terminal in the connected mode sends service request information to the AS of the terminal, the service request information including a service category of a service requested to be established by the terminal.

In S230, the AS of the terminal acquires a random number generated for a target service, or acquires an AC of the terminal.

In S240, the AS of the terminal finds a barring probability or barring bitmap corresponding to the service category from the barring parameters according to the service category of the target service in the service request information, and judges whether the terminal is to be barred from establishing the bearer of the target service according to the random number or AC acquired in S230.

In S250, when it is determined that the terminal is to be barred from establishing the bearer of the target service, the AS of the terminal sends first indication information indicating that establishment of the bearer of the target service is barred to the NAS of the terminal.

When it is determined that the terminal is allowed to establish the bearer of the target service, the operation S261 is executed, in which the AS of the terminal sends second indication information indicating that the bearer of the target service is allowed to be established to the NAS of the terminal is executed, and the operation S262 is executed, in which the AS of the terminal initiates a flow of establishing the bearer of the target service to the access network device.

In another example, the method 100 is executed by the access network device, that is, the executive subject of the method 100 is the access network device. The operation of acquiring the service request information in S110 includes that: the service request information sent by the core network device is received, the service request information being configured to notify the access network device that the NAS of the terminal sends the service request to the core network device and the service request information including the service category of the target service. The operation of acquiring the service category barring information in S120 includes that: the service category barring information is generated, the service category barring information including the multiple service categories and the parameters corresponding to the multiple service categories respectively.

In the embodiment of the disclosure, the method 100 may further include that: when it is determined that the terminal is to be barred from establishing the bearer of the target service according to the barring parameter, the access network device sends third indication information indicating that establishment of the bearer of the target service is barred to the core network device to enable the core network device to notify the NAS of the terminal that establishment of the bearer of the target service is barred.

Or, in the embodiment of the disclosure, the method 100 may further include that: when it is determined that the terminal is allowed to establish the bearer of the target service according to the barring parameter, the access network device sends fourth indication information indicating that establishment of the bearer of the target service is allowed to the AS of the terminal.

Figure 3:
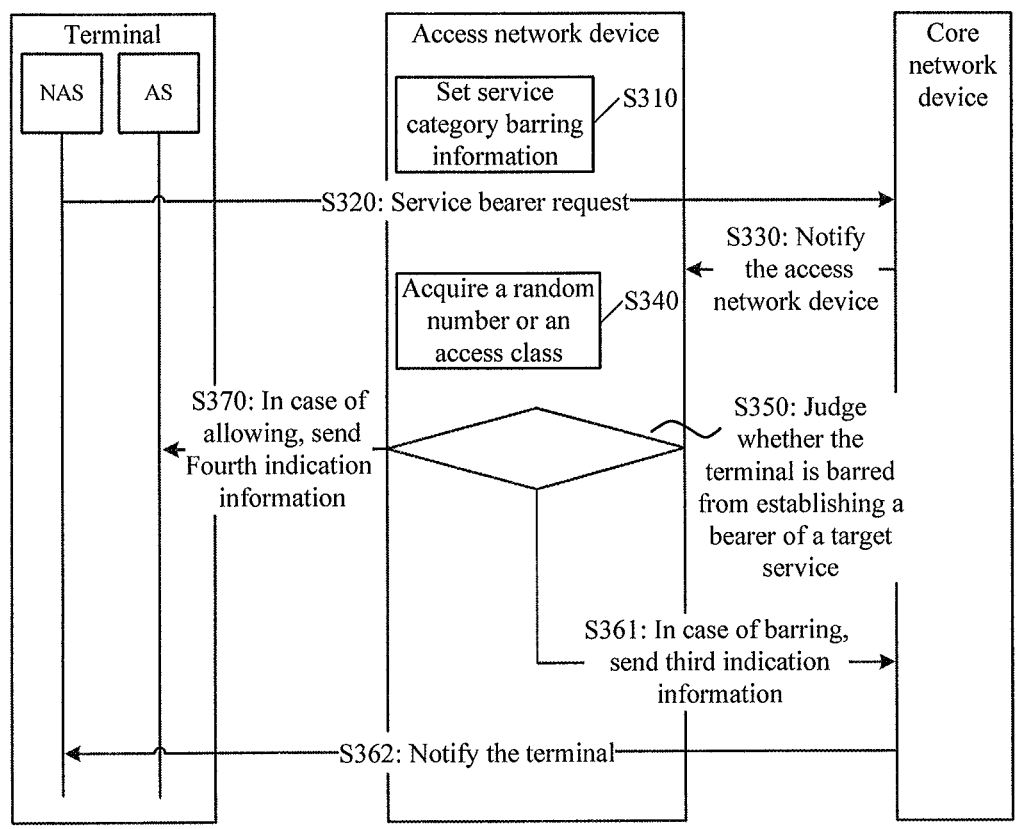
FIG. 3 illustrates a schematic flowchart of a service category congestion control method according to another embodiment of the disclosure.

FIG. 3 illustrates a schematic flowchart of a service category congestion control method 300 according to an embodiment of the disclosure. The method 300 includes the following operations.

In S310, an access network device sets service category barring information according to a condition of a data service born by a current network. The service category barring information includes multiple service categories and a barring parameter, for example, a barring probability or a barring bitmap, corresponding to each service category in a connected mode. Of course, the access network device in S310 may also generate access barring information (for example, an access barring probability or an AC bitmap) in an idle mode together to execute congestion control on terminals in the idle mode, which will not be limited in the embodiment of the disclosure.

In S320, a NAS of the terminal in the connected mode sends a service request to a core network device, the request including a service category of a service requested to be established by the terminal.

In S330, the core network device notifies the access network device that the terminal requests the core network device to establish the service bearer through service request information. The service request information includes the service category of the service requested to be established by the terminal.

In S340, the access network device acquires a random number generated by the terminal for a target service (preferably, the terminal generates the random number for the target service, and sends it to the access network device), or the access network device acquires an AC of the terminal. It is to be understood that the random number or the AC may be included in the service request for sending to the core network device, and is notified to the access network device by the core network device. The random number or the AC may also be independently sent to the access network device. A manner for acquiring the random number or the AC by the access network device is not limited in the embodiment of the disclosure.

In S350, the access network device finds the barring probability or barring bitmap corresponding to the service category from the barring parameters according to the service category of the target service in the service request information, and judges whether the terminal is to be barred from establishing the bearer of the target service according to the random number or AC acquired in S340.

When it is determined that the terminal is to be barred from establishing the bearer of the target service, the operation S361 is executed, in which the access network device sends third indication information indicating that establishment of the bearer of the target service is barred to the core network device, and operation S362 is also executed, in which the core network device notifies the NAS of the terminal that establishment of the bearer of the target service is barred.

When it is determined that the terminal is allowed to establish the bearer of the target service, the operation S370 is executed, in which the access network device sends fourth indication information indicating that establishment of the bearer of the target service is allowed to an AS of the terminal.

In another example, the method 100 is executed by the access network device, that is, the executive subject of the method 100 is the access network device. The operation of acquiring the service request information in S110 includes that: the service request information sent by the AS of the terminal is received. The operation of acquiring the service category barring information in S120 includes that: the service category barring information is generated, the service category barring information including the multiple service categories and the barring parameters corresponding to the multiple service categories respectively.

In the embodiment of the disclosure, the method 100 may further include that: when it is determined that the terminal is to be barred from establishing the bearer of the target service according to the barring parameter, the access network device sends fifth indication information indicating that establishment of the bearer of the target service is barred to the AS of the terminal.

Or, in the embodiment of the disclosure, the method 100 may further include that: when it is determined that the terminal is allowed to establish the bearer of the target service according to the barring parameter, the access network device sends sixth indication information indicating that establishment of the bearer of the target service is allowed to the core network device.

Figure 4:
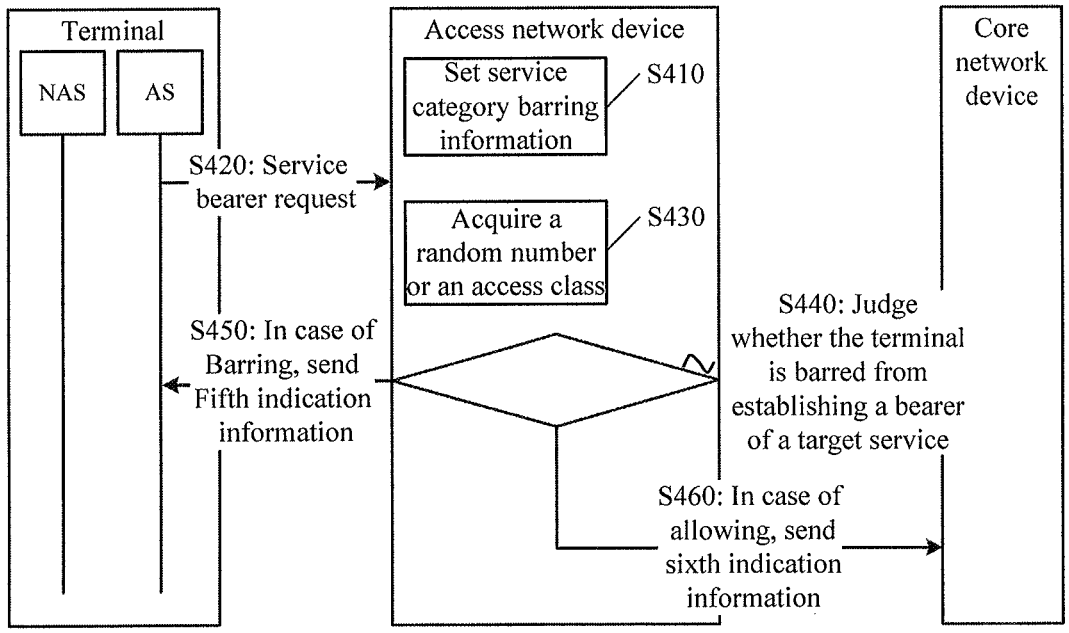
FIG. 4 illustrates a schematic flowchart of a service category congestion control method according to another embodiment of the disclosure.

FIG. 4 illustrates a schematic flowchart of a service category congestion control method 400 according to an embodiment of the disclosure. The method 400 includes the following operations.

In S410, an access network device sets service category barring information according to a condition of a data service born by a current network. The service category barring information includes multiple service categories and a barring parameter, for example, a barring probability or a barring bitmap, corresponding to each service category in a connected mode. Of course, the access network device in S410 may also generate access barring information (for example, an access barring probability or an AC bitmap) in an idle mode together to execute congestion control on terminals in the idle mode, which will not be limited in the embodiment of the disclosure.

In S420, an AS of the terminal in the connected mode sends service request information to the access network device, the request including a service category of a service requested to be established by the terminal.

In S430, the access network device acquires a random number generated by the terminal for a target service (preferably, the terminal generates the random number for the target service, and sends it to the access network device), or the access network device acquires an AC of the terminal. It is to be understood that the random number or the AC may be included in a service request for sending to the core network device, and is notified to the access network device by the core network device; and the random number or the AC may also be independently sent to the access network device. A manner for acquiring the random number or the AC by the access network device is not limited in the embodiment of the disclosure.

In S440, the access network device finds the barring probability or barring bitmap corresponding to the service category from the barring parameters according to the service category of the target service in the service request information, and judges whether the terminal is to be barred from establishing the bearer of the target service according to the random number or AC acquired in S430.

When it is determined that the terminal is to be barred from establishing the bearer of the target service, the operation S450 is executed, in which the access network device sends fifth indication information indicating that establishment of the bearer of the target service is barred to the AS of the terminal.

When it is determined that the terminal is allowed to establish the bearer of the target service, the operation S460 is executed, in which the access network device sends sixth indication information indicating that establishment of the bearer of the target service is allowed to the core network device, the sixth indication information including information of the service requested to be established by the terminal.

In another example, the method 100 is executed by the core network device, that is, the executive subject of the method 100 is the core network device. The operation of acquiring the service request information in S110 includes that: the service request information sent by the NAS of the terminal is received. The operation of acquiring the service category barring information in S120 includes that: the service category barring information sent by the access network device is received, the service category barring information including the multiple service categories and the barring parameters corresponding to the multiple service categories respectively.

In the embodiment of the disclosure, the method 100 may further include that: when it is determined that the terminal is to be barred from establishing the bearer of the target service according to the barring parameter, the core network device sends seventh indication information indicating that establishment of the bearer of the target service is barred to the NAS of the terminal.

Or, in the embodiment of the disclosure, the method 100 may further include that: when it is determined that the terminal is allowed to establish the bearer of the target service according to the barring parameter, the core network device sends eighth indication information indicating that establishment of the bearer of the target service is allowed to the access network device.

Figure 5:
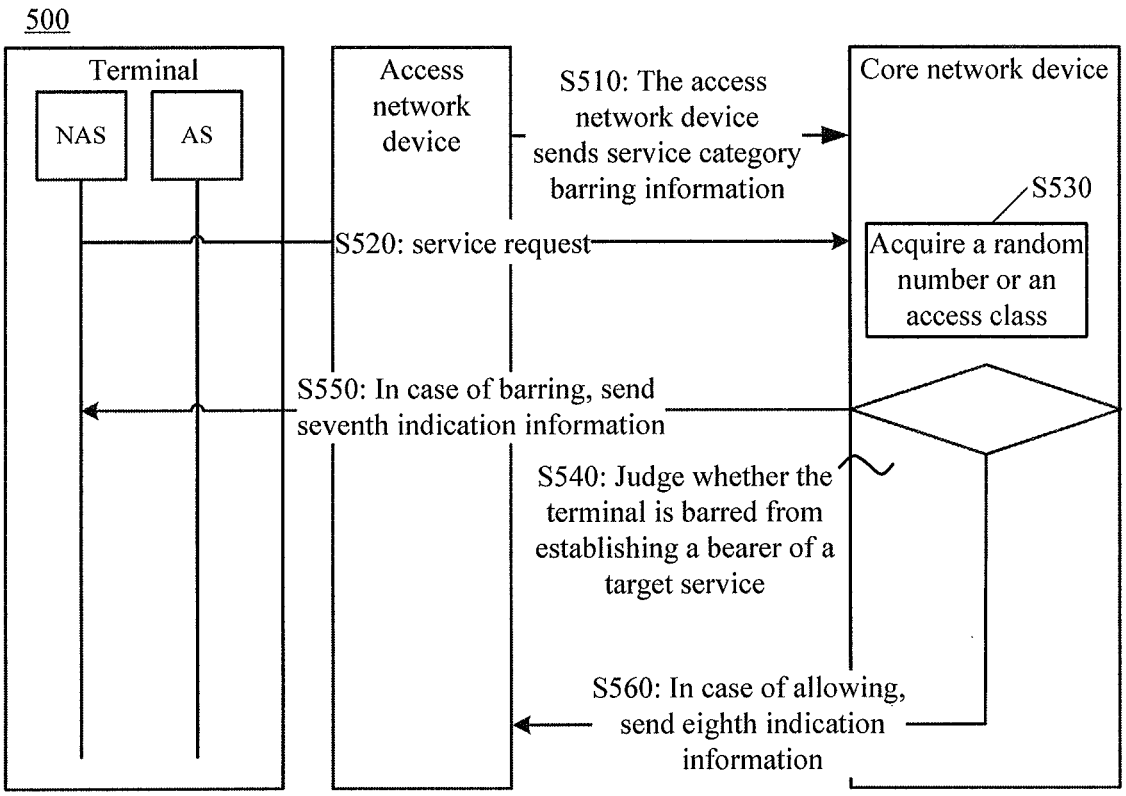
FIG. 5 illustrates a schematic flowchart of a service category congestion control method according to another embodiment of the disclosure.

FIG. 5 illustrates a schematic flowchart of a service category congestion control method 500 according to an embodiment of the disclosure. The method 500 includes the following operations.

In S510, a core network device receives service category barring information sent by an access network device. The service category barring information is set by the access network device according to a condition of a data service born by a current network. The service category barring information includes multiple service categories and a barring parameter, for example, a barring probability or a barring bitmap, corresponding to each service category in a connected mode. Of course, the access network device in S510 may also generate access barring information (for example, an access barring probability or an AC bitmap) in an idle mode together for sending to a terminal (shown in FIG. 5) to execute congestion control on the terminals in the idle mode, which will not be limited in the embodiment of the disclosure.

In S520, a NAS of the terminal in the connected mode sends service request information to the core network device, the request including a service category of a service requested to be established by the terminal.

In S530, the core network device acquires a random number generated by the terminal for a target service (preferably, the terminal generates the random number for the target service, and sends it to the access network device), or the core network device acquires an AC of the terminal. It is to be understood that the random number or the AC may be included in the service request information for sending to the core network device. The random number or the AC may also be independently sent to the core network device. A manner for acquiring the random number or the AC by the core network device is not limited in the embodiment of the disclosure.

In S540, the core network device finds the barring probability or barring bitmap corresponding to the service category from the barring parameters according to the service category of the target service in the service request information, and judges whether the terminal is to be barred from establishing the bearer of the target service according to the random number or AC acquired in S530.

When it is determined that the terminal is to be barred from establishing the bearer of the target service, the operation S550 is executed, in which the core network device sends seventh indication information indicating that establishment of the bearer of the target service is barred to the NAS of the terminal.

When it is determined that the terminal is allowed to establish the bearer of the target service, the operation S560 is executed, in which the core network device sends eighth indication information indicating that establishment of the bearer of the target service is allowed to the access network device.

The service category congestion control method of the embodiment of the disclosure is described above in detail from the view of the executive subject which judges whether establishment of the bearer of the target service is barred. The service category congestion control method will be described below from the view of the terminal.

Figure 6:
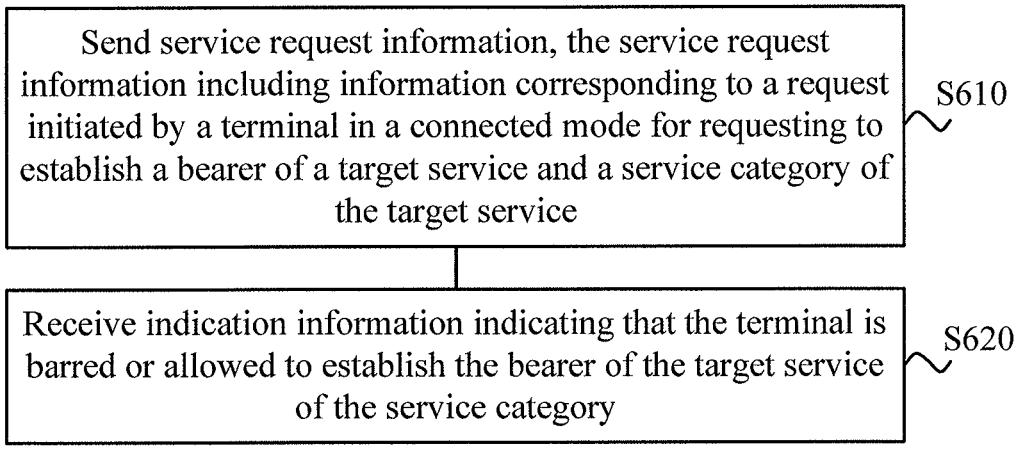
FIG. 6 illustrates a schematic flowchart of a service category congestion control method according to another embodiment of the disclosure.

FIG. 6 illustrates a schematic flowchart of a service category congestion control method 600 according to an embodiment of the disclosure. The method 600 is executed by a terminal in a connected mode, and includes the following operations.

In S610, service request information is sent, the service request information including information corresponding to a request for establishing a bearer of a target service initiated by the terminal in the connected mode and the service request information including a service category of the target service.

In S620, indication information indicating that the terminal is barred from establishing or allowed to establish the bearer of the target service of the service category is received.

According to the service category congestion control method of the embodiment of the disclosure, controlling bearer establishment of the terminal in the connected mode may effectively solve the problem of unfairness between a low-priority service request initiated by the terminal which accesses a network through a high-priority service request and a low-priority service request directly initiated by another terminal in an idle mode, thereby implementing a congestion control mechanism fair to each terminal.

Alternatively, as an embodiment, the operation of sending the service request information in S610 includes that: the terminal sends the service request information to an AS through a NAS; and the operation of receiving the indication information indicating that the terminal is barred from establishing or allowed to establish the bearer of the target service of the service category in S620 includes that: the NAS of the terminal receives the indication information sent by the AS of the terminal.

It is to be understood that the embodiment corresponds to a signaling flow of the method 200.

Alternatively, as another embodiment, the operation of sending the service request information in S610 includes that: the terminal sends the service request information to a core network device through the NAS; and the operation of receiving the indication information indicating that the terminal is barred from establishing or allowed to establish the bearer of the target service of the service category in S620 includes that: the terminal receives indication information indicating that the terminal is barred from establishing the bearer of the target service from the core network device through the NAS, or the terminal receives indication information indicating that the terminal is allowed to establish the bearer of the target service from an access network device through the AS.

It is to be understood that the embodiment corresponds to a signaling flow of the method 300.

Alternatively, as another embodiment, the operation of sending the service request information in S610 includes that: the terminal sends the service request information to the access network device through the AS; and the operation of receiving the indication information indicating that the terminal is barred from establishing or allowed to establish the bearer of the target service of the service category in S620 includes that: the terminal receives the indication information indicating that the terminal is barred from establishing the bearer of the target service from the access network device through the AS.

It is to be understood that the embodiment corresponds to a signaling flow of the method 400.

Alternatively, as another embodiment, the operation of sending the service request information in S610 includes that: the terminal sends the service request information to the core network device through the NAS; and the operation of receiving the indication information indicating that the terminal is barred from establishing or allowed to establish the bearer of the target service of the service category in S620 includes that: the terminal receives the indication information indicating that the terminal is barred from establishing the bearer of the target service from the core network device through the NAS.

It is to be understood that the embodiment corresponds to a signaling flow of the method 500.

The service category congestion control method will be described below from the view of the core network device.

Figure 7:
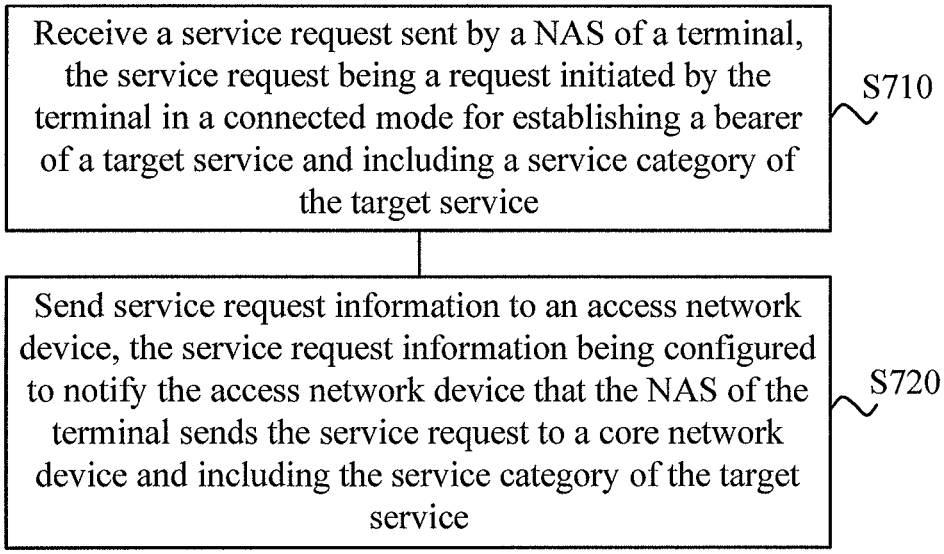
FIG. 7 illustrates a schematic flowchart of a service category congestion control method according to another embodiment of the disclosure.

FIG. 7 illustrates a schematic flowchart of a service category congestion control method 700 according to an embodiment of the disclosure. The method 700 is executed by a core network device, and includes the following operations.

In S710, a service request sent by a NAS of a terminal is received, the service request being a request for establishing a bearer of a target service initiated by the terminal in a connected mode and the service request including a service category of the target service.

In S720, service request information is sent to an access network device, the service request information being configured to notify the access network device that the NAS of the terminal sends the service request to the core network device and the service request information including the service category of the target service.

Alternatively, as an embodiment, the method 700 may further include that: indication information indicating that the terminal is barred from establishing the bearer of the target service of the service category is received from the access network device; and the terminal is notified to bar establishment of the bearer of the target service of the service category.

It is to be understood that the embodiment corresponds to the signaling flow of the method 300.

Figure 8:
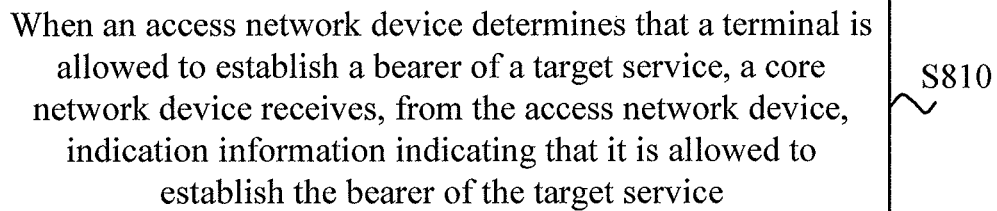
FIG. 8 illustrates a schematic flowchart of a service category congestion control method according to another embodiment of the disclosure.

FIG. 8 illustrates a schematic flowchart of a service category congestion control method 800 according to an embodiment of the disclosure. The method 800 is executed by a core network device, and includes the following operation.

In S810, when an access network device determines that a terminal is allowed to establish a bearer of a target service, the core network device receives indication information indicating that establishment of the bearer of the target service is allowed from the access network device.

It is to be understood that the embodiment corresponds to the signaling flow of the method 400.

The service category congestion control method will be described below from the view of the access network device.

Figure 9:
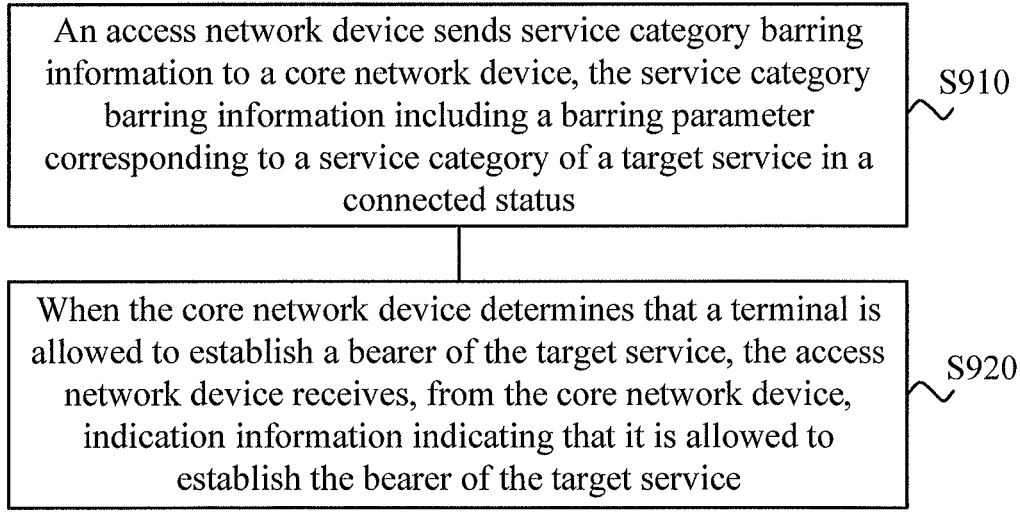
FIG. 9 illustrates a schematic flowchart of a service category congestion control method according to another embodiment of the disclosure.

FIG. 9 illustrates a schematic flowchart of a service category congestion control method 900 according to an embodiment of the disclosure. The method 900 is executed by an access network device, and includes the following operations.

In S910, the access network device sends service category barring information to a core network device, the service category barring information including a barring parameter corresponding to a service category of a target service in a connected mode.

In S920, when the core network device determines that a terminal is allowed to establish a bearer of the target service, the access network device receives indication information indicating that establishment of the bearer of the target service is allowed from the core network device.

It is to be understood that the embodiment corresponds to the signaling flow of the method 500.

It is to be understood that, in each embodiment of the disclosure, a magnitude of a sequence number of each process does not mean an execution sequence, the execution sequence of each process should be determined according to its function and an internal logic, and an implementation process of the embodiment of the disclosure should not be limited.

The service category congestion control methods of the embodiments of the disclosure are described above in detail, and service category congestion control device of the embodiments of the disclosure will be described below.

Figure 10:
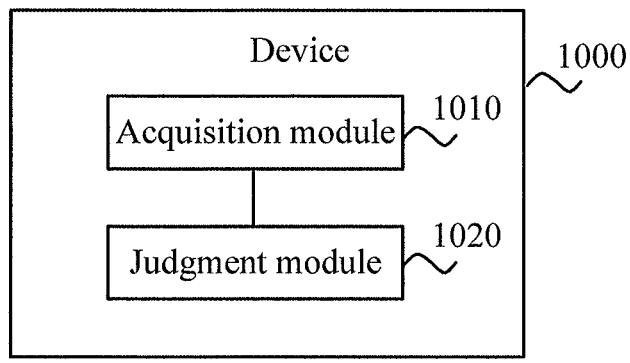
FIG. 10 illustrates a schematic block diagram of a service category congestion control device according to an embodiment of the disclosure.

FIG. 10 illustrates a schematic block diagram of service category congestion control device 1000 according to an embodiment of the disclosure. The device 1000 includes an acquisition module 1010 and a judgment module 1020.

The acquisition module 1010 is configured to acquire service request information, the service request information including information corresponding to a request for establishing a bearer of a target service initiated by a terminal in a connected mode and the service request information including a service category of the target service.

The acquisition module 1010 is further configured to acquire service category barring information, the service category barring information including a barring parameter corresponding to the service category of the target service in the connected mode.

The judgment module 1020 is configured to judge whether the terminal is to be barred from establishing the bearer of the target service of the service category according to the barring parameter.

According to the service category congestion control device of the embodiment of the disclosure, controlling bearer establishment of the terminal in the connected mode according to the barring parameter may effectively solve the problem of unfairness between a low-priority service request initiated by the terminal which accesses a network through a high-priority service request and a low-priority service request directly initiated by another terminal in an idle mode, thereby implementing a congestion control mechanism fair to each terminal.

Alternatively, as an embodiment, the barring parameter is a barring probability, and the acquisition module 1010 is further configured to: acquire a random number generated by the terminal for the target service; and the judgment module 1020 is specifically configured to: when the random number is smaller than the barring probability, bar the terminal from establishing the bearer of the target service, and when the random number is larger than the barring probability, allow the terminal to establish the bearer of the target service.

Alternatively, in the embodiment of the disclosure, the barring probability is lower than an access barring probability corresponding to the service category of the target service in the idle mode.

Alternatively, as another embodiment, the barring parameter is a barring bitmap, and the acquisition module 1010 is further configured to: acquire an AC of the terminal; and the judgment module 1020 is specifically configured to: when the AC of the terminal is set to be 1 in the barring bitmap, bar the terminal from establishing the bearer of the target service, and when the AC of the terminal is not set to be 1 in the barring bitmap, allow the terminal to establish the bearer of the target service.

In the embodiment of the disclosure, a number of bits set to be 1 in the barring bitmap may be smaller than a number of bits set to be 1 in a bitmap corresponding to the service category of the target service in the idle mode.

Alternatively, in the embodiment of the disclosure, the device 1000 is an AS of the terminal, and in order to acquire the service request information, the acquisition module 1010 is configured to receive the service request information sent by a NAS of the terminal; and in order to acquires the service category barring information, the acquisition module 1010 is configured to receive the service category barring information broadcast by an access network device, the service category barring information including multiple service categories and barring parameters corresponding to the multiple service categories respectively.

Alternatively, as an embodiment, the device 1000 further includes: a sending module, configured to, when it is determined that the terminal is to be barred from establishing the bearer of the target service according to the barring parameter, send first indication information indicating that establishment of the bearer of the target service is barred to the NAS.

Alternatively, as another embodiment, the device 1000 further includes: a sending module, configured to, when it is determined that the terminal is allowed to establish the bearer of the target service according to the barring parameter, send second indication information indicating that establishment of the bearer of the target service is allowed to the NAS, and initiate, by the AS, a flow of establishing the bearer of the target service to the access network device.

Alternatively, in the embodiment of the disclosure, the device 1000 is the access network device, in order to acquire the service request information, the acquisition module 1010 is configured to receive the service request information sent by a core network device, the service request information being configured to notify the access network device that the NAS of the terminal sends the service request to the core network device and the service request information including the service category of the target service; and in order to acquire the service category barring information, the acquisition module 1010 is configured to generate the service category barring information, the service category barring information including the multiple service categories and the barring parameters corresponding to the multiple service categories respectively.

Alternatively, as an embodiment, the device 1000 further includes: a sending module, configured to, when it is determined that the terminal is to be barred from establishing the bearer of the target service according to the barring parameter, send third indication information indicating that establishment of the bearer of the target service is barred to the core network device, to enable the core network device to notify the NAS of the terminal to bar establishment of the bearer of the target service.

Alternatively, as another embodiment, the device 1000 further includes: a sending module, configured to, when it is determined that the terminal is allowed to establish the bearer of the target service according to the barring parameter, send fourth indication information indicating that establishment of the bearer of the target service is allowed to the AS of the terminal.

Alternatively, in the embodiment of the disclosure, the device 1000 is the access network device, and in order to acquire the service request information, the acquisition module 1010 is configured to receive the service request information sent by the AS of the terminal; and in order to acquire the service category barring information, the acquisition module 1010 is configured to generate the service category barring information, the service category barring information including the multiple service categories and the barring parameters corresponding to the multiple service categories respectively.

Alternatively, as an embodiment, the device 1000 further includes: a sending module, configured to, when it is determined that the terminal is to be barred from establishing the bearer of the target service according to the barring parameter, send fifth indication information indicating that establishment of the bearer of the target service is barred to the AS of the terminal.

Alternatively, as an embodiment, the device 1000 further includes: a sending module, configured to, when it is determined that the terminal is allowed to establish the bearer of the target service according to the barring parameter, send sixth indication information indicating that establishment of the bearer of the target service is allowed to the core network device.

Alternatively, in the embodiment of the disclosure, the device 1000 is the core network device, and in order to acquire the service request information, the acquisition module 1010 is configured to receive the service request information sent by the NAS of the terminal; and in order to acquire the service category barring information, the acquisition module 1010 is configured to receive the service category barring information sent by the access network device, the service category barring information including the multiple service categories and the barring parameters corresponding to the multiple service categories respectively.

Alternatively, as an embodiment, the device 1000 further includes: a sending module, configured to, when it is determined that the terminal is barred from establishing the bearer of the target service according to the barring parameter, send seventh indication information indicating that establishment of the bearer of the target service is barred to the NAS of the terminal.

Alternatively, as another embodiment, the device 1000 further includes: a sending module, configured to, when it is determined that the terminal is allowed to establish the bearer of the target service according to the barring parameter, send eighth indication information indicating that establishment of the bearer of the target service is allowed to the access network device.

Figure 11:
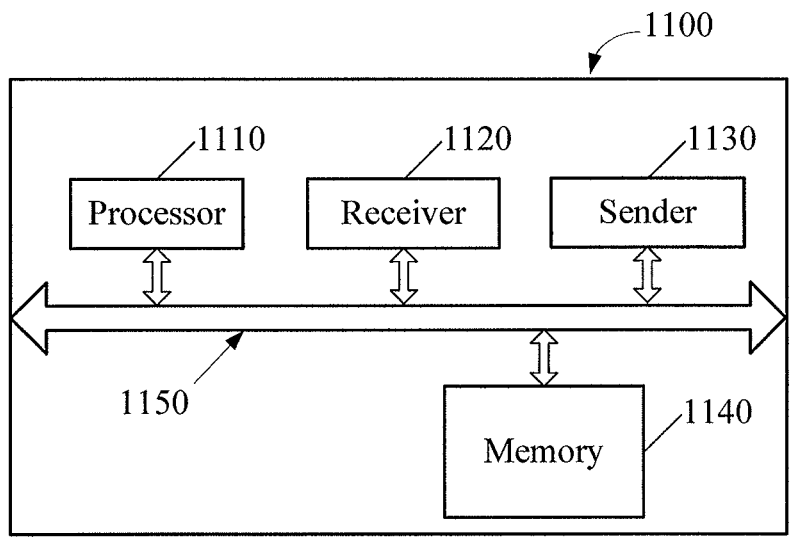
FIG. 11 illustrates a schematic block diagram of a service category congestion control device according to another embodiment of the disclosure.

It is to be noted that, in the embodiment of the disclosure, the acquisition module may be implemented by a receiver or a processor, the sending module may be implemented by a sender, and a judgment 1020 may be implemented by the processor. As shown in FIG. 11, device 1100 may include a processor 1110, a receiver 1120, a sender 1130 and a memory 1140, where the memory 1140 may be configured to store codes executed by the processor 1110 and the like.

Each component in the device 1100 is coupled together through a bus system 1150, where the bus system 1150 includes a data bus, and further includes a power bus, a control bus and a state signal bus.

The device 1000 shown in FIG. 10 or the device 1100 shown in FIG. 11 may implement each process implemented in the embodiments shown in FIG. 1 to FIG. 9, which will not be elaborated herein to avoid repetition.

It is to be noted that the method embodiments of the disclosure may be applied to a processor or implemented by the processor. The processor may be an integrated circuit chip with a signal processing capability. In an implementation process, each operation of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, operation and logical block diagram disclosed in the embodiments of the disclosure may be implemented or executed. The universal processor may be a microprocessor or the processor may also be any conventional processor and the like. The operations of the methods disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the operations of the methods in combination with hardware.

It can be understood that the memory in the embodiment of the disclosure may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

Figure 12:
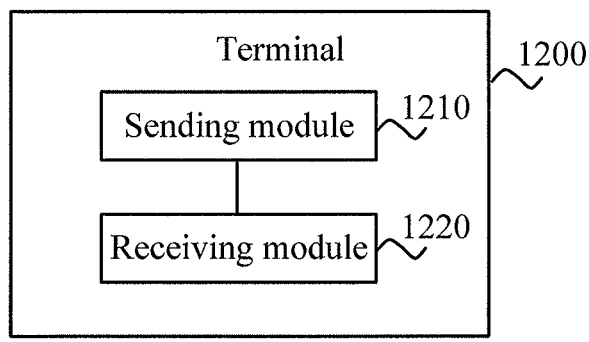
FIG. 12 illustrates a schematic block diagram of a terminal according to an embodiment of the disclosure.

FIG. 12 illustrates a schematic block diagram of a service category congestion control terminal 1200 according to an embodiment of the disclosure. The terminal 1200 includes: a sending module 1210 and a receiving module 1220.

The sending module 1210 is configured to send service request information, the service request information including information corresponding to a request for establishing a bearer of a target service initiated by the terminal in a connected mode and the service request information including a service category of the target service.

The receiving module 1220 is configured to receive indication information indicating that the terminal is barred from establishing or allowed to establish the bearer of the target service of the service category.

Alternatively, as an embodiment, the sending module 1210 is specifically configured to: send the service request information to an AS through a NAS; and the receiving module 1220 is specifically configured to: receive, by the NAS, the indication information sent by the AS of the terminal.

Alternatively, as another embodiment, the sending module 1210 is specifically configured to: send the service request information to a core network device through the NAS; and the receiving module 1220 is specifically configured to: receive indication information indicating that the terminal is barred from establishing the bearer of the target service from the core network device through the NAS, or receive, by the terminal, indication information indicating that the terminal is allowed to establish the bearer of the target service from an access network device through the AS.

Alternatively, as another embodiment, the sending module 1210 is specifically configured to: send the service request information to the access network device through the AS; and the receiving module 1220 is specifically configured to receive the indication information indicating that the terminal is barred from establishing the bearer of the target service from the access network device through the AS.

Alternatively, as another embodiment, the sending module 1210 is specifically configured to send the service request information to the core network device through the NAS; and the receiving module 1220 is specifically configured to receive the indication information indicating that the terminal is barred from establishing the bearer of the target service from the core network device through the NAS.

Figure 13:
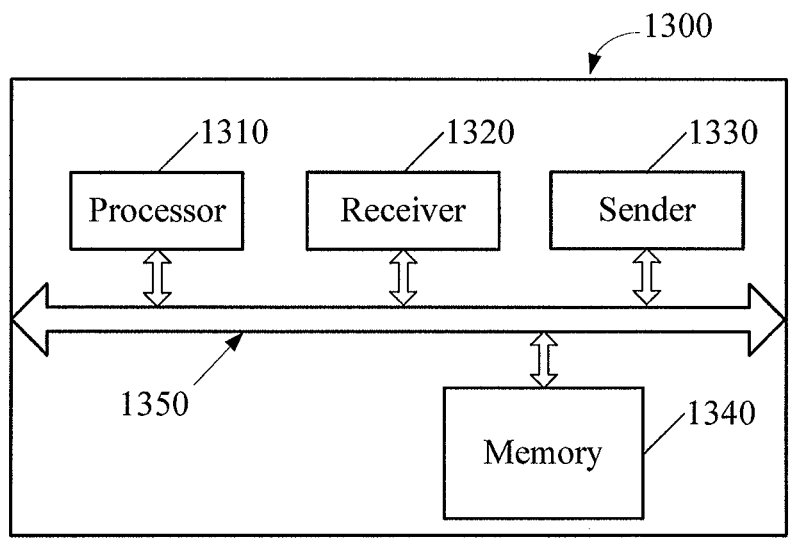
FIG. 13 illustrates a schematic block diagram of a terminal according to another embodiment of the disclosure.

It is to be noted that, in the embodiment of the disclosure, the sending module 1210 may be implemented by a sender, and the receiving module 1220 may be implemented by a receiver. As shown in FIG. 13, a terminal 1300 may include a processor 1310, a receiver 1320, a sender 1330 and a memory 1340. The memory 1340 may be configured to store codes executed by the processor 1310 and the like.

Each component in the terminal 1300 is coupled together through a bus system 1350. The bus system 1350 includes a data bus, and further includes a power bus, a control bus and a state signal bus.

The terminal 1200 shown in FIG. 12 or the terminal 1300 shown in FIG. 13 may implement each process implemented in the embodiments shown in FIG. 1 to FIG. 9, which will not be elaborated herein to avoid repetition.

Figure 14:
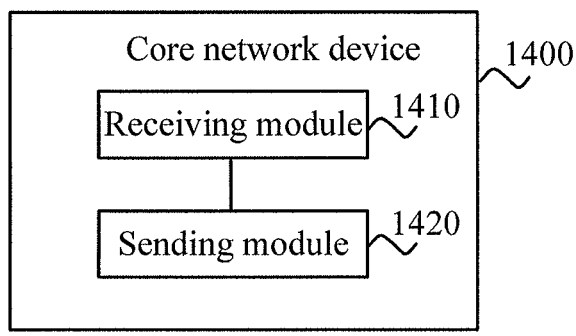
FIG. 14 illustrates a schematic block diagram of a core network device according to an embodiment of the disclosure.

FIG. 14 illustrates a schematic block diagram of service category congestion control core network device 1400 according to an embodiment of the disclosure. The core network device 1400 includes a receiving module 1410 and a sending module 1420.

The receiving module 1410 is configured to receive a service request sent by a NAS of a terminal, the service request being a request for establishing a bearer of a target service initiated by the terminal in a connected mode and the service request including a service category of the target service.

The sending module 1420 is configured to send service request information to an access network device, the service request information being configured to notify the access network device that the NAS of the terminal sends the service request to the core network device and the service request information including the service category of the target service.

Alternatively, as an embodiment, the receiving module 1410 is further configured to receive indication information indicating that the terminal is barred from establishing the bearer of the target service of the service category from the access network device; and the sending module 1420 is further configured to notify the terminal to bar establishment of the bearer of the target service of the service category.

Figure 15:
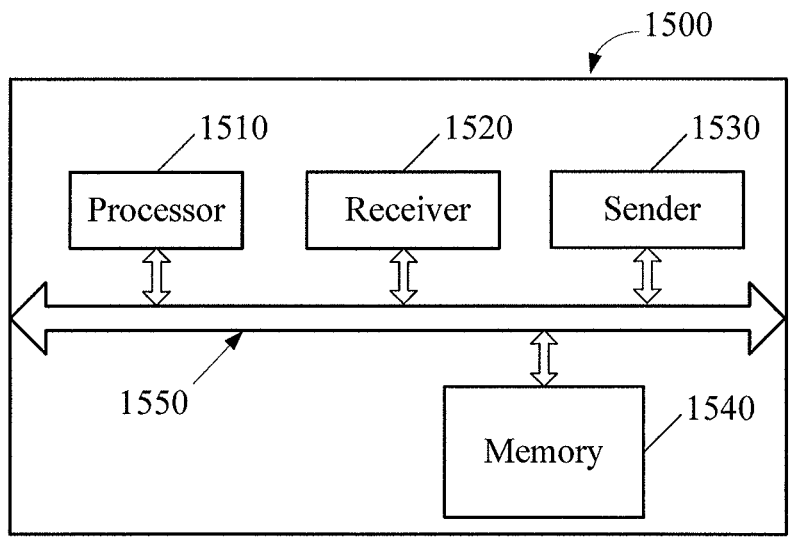
FIG. 15 illustrates a schematic block diagram of a core network device according to another embodiment of the disclosure.

It is to be noted that, in the embodiment of the disclosure, the sending module 1420 may be implemented by a sender, and the receiving module 1410 may be implemented by a receiver. As shown in FIG. 15, a core network device 1500 may include a processor 1510, a receiver 1520, a sender 1530 and a memory 1540. The memory 1540 may be configured to store codes executed by the processor 1510 and the like.

Each component in the core network device 1500 is coupled together through a bus system 1550. The bus system 1550 includes a data bus, and further includes a power bus, a control bus and a state signal bus.

The core network device 1400 shown in FIG. 14 or the core network device 1500 shown in FIG. 15 may implement each process implemented in the embodiments shown in FIG. 1 to FIG. 9, which will not be elaborated herein to avoid repetition.

Figure 16:
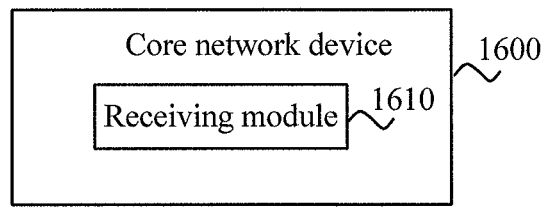
FIG. 16 illustrates a schematic block diagram of a core network device according to an embodiment of the disclosure.

FIG. 16 illustrates a schematic block diagram of service category congestion control core network device 1600 according to an embodiment of the disclosure. The core network device 1600 includes a receiving module 1610.

The receiving module 1610 is configured to, when an access network device determines that a terminal is allowed to establish a bearer of a target service, receive indication information indicating that establishment of the bearer of the target service is allowed from the access network device.

Figure 17:
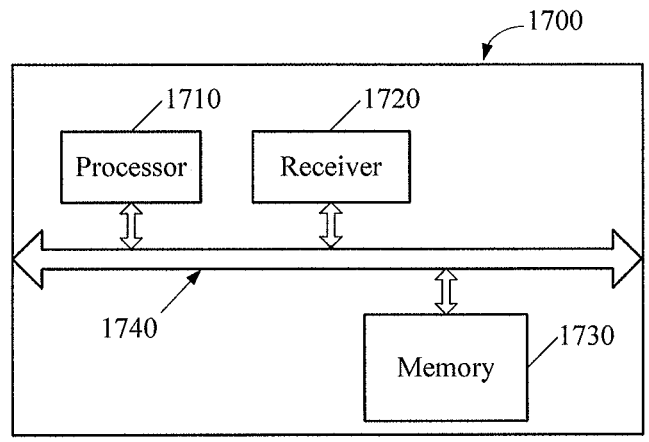
FIG. 17 illustrates a schematic block diagram of a core network device according to another embodiment of the disclosure.

It is to be noted that, in the embodiment of the disclosure, the receiving module 1610 may be implemented by a receiver. As shown in FIG. 17, a core network device 1700 may include a processor 1710, a receiver 1720 and a memory 1730. The memory 1730 may be configured to store codes executed by the processor 1710 and the like.

Each component in the core network device 1700 is coupled together through a bus system 1740. The bus system 1740 includes a data bus, and further includes a power bus, a control bus and a state signal bus.

The core network device 1600 shown in FIG. 16 or the core network device 1700 shown in FIG. 17 may implement each process implemented in the embodiments shown in FIG. 1 to FIG. 9, which will not be elaborated herein to avoid repetition.

Figure 18:
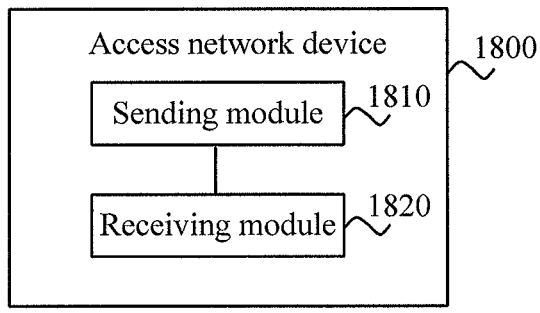
FIG. 18 illustrates a schematic block diagram of an access network device according to an embodiment of the disclosure.

FIG. 18 illustrates a schematic block diagram of service category congestion control access network device 1800 according to an embodiment of the disclosure. The access network device 1800 includes a sending module 1810 and a receiving module 1820.

The sending module 1810 is configured to send service category barring information to a core network device, the service category barring information including a barring parameter corresponding to a service category of a target service in a connected mode.

The receiving module 1820 is configured to, when the core network device determines that a terminal is allowed to establish a bearer of the target service, receive indication information indicating that establishment of the bearer of the target service is allowed from the core network device.

Figure 19:
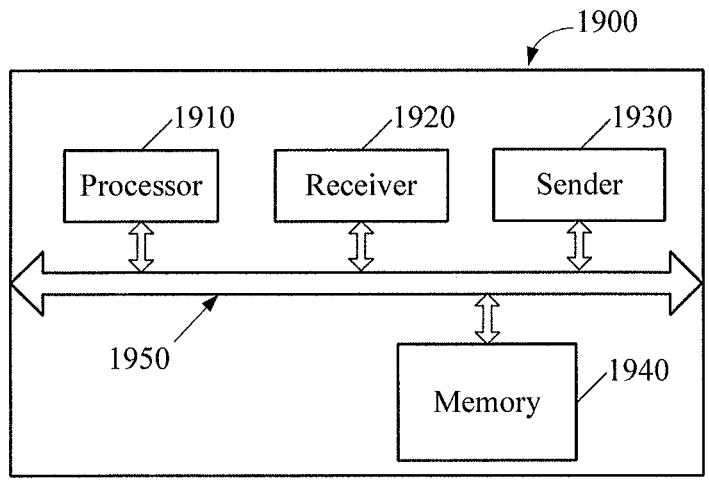
FIG. 19 illustrates a schematic block diagram of an access network device according to another embodiment of the disclosure.

It is to be noted that, in the embodiment of the disclosure, the sending module 1810 may be implemented by a sender, and the receiving module 1820 may be implemented by a receiver. As shown in FIG. 19, an access network device 1900 may include a processor 1910, a receiver 1920, a sender 1930 and a memory 1940. The memory 1940 may be configured to store codes executed by the processor 1910 and the like.

Each component in the access network device 1900 is coupled together through a bus system 1950. The bus system 1950 includes a data bus, and further includes a power bus, a control bus and a state signal bus.

The access network device 1800 shown in FIG. 18 or the access network device 1900 shown in FIG. 19 may implement each process implemented in the embodiments shown in FIG. 1 to FIG. 9, which will not be elaborated herein to avoid repetition.

Those skilled in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solution. Those skilled in the art may realize the described functions for each specific application by virtue of different methods, but such realization shall fall within the scope of the disclosure.

Those skilled in the art may clearly learn indicating that specific working processes of the system, device and unit described above may be seen from the corresponding processes in the method embodiment for convenient and brief description and will not be elaborated herein.

In some embodiments provided by the disclosure, it is to be understood that the disclosed system, device and method may be implemented in another manner. The device embodiment described above is only schematic, and for example, division of the units is only logic function division, and other division manners may be adopted during practical implementation. For example, multiple units or components may be combined or integrated into another system, or some characteristics may be neglected executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two unit may also be integrated into a unit.

When being implemented in form of software function unit and sold or used as an independent product, the function may also be stored in a computer-readable storage medium. Based on such an understanding, the technical solutions of the disclosure substantially or parts making contributions to a conventional art may be embodied in form of software product, and the computer software product is stored in a storage medium, including a plurality of instructions configured to enable a piece of computer device (which may be a personal computer, a server, network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A service category congestion control method, comprising:
   sending, by a terminal, service request information to a network device, the service request information comprising information corresponding to a request initiated by the terminal which is in a connected mode and has accessed the network device through another service request, the request initiated by the terminal being used for establishing a bearer of a target service and the service request information comprising a service category of the target service; and
   receiving, by the terminal, indication information sent by the network device in response to the service request information, the indication information indicating that the terminal is barred from establishing or allowed to establish the bearer of the target service of the service category,
   wherein the sending service request information comprises: sending, by the terminal, the service request information to a core network device through a Non-Access Stratum (NAS) of the terminal and wherein the receiving indication information indicating that the terminal is barred from establishing or allowed to establish the bearer of the target service of the service category comprises: receiving, by the terminal, the indication information indicating that the terminal is barred from establishing the bearer of the target service from the core network device through the NAS, or receiving, by the terminal, the indication information indicating that the terminal is allowed to establish the bearer of the target service from an access network device through an Access Stratum (AS) of the terminal; or
   wherein the sending service request information comprises: sending, by the terminal, the service request information to an access network device through an Access Stratum (AS) of the terminal and wherein receiving the indication information indicating that the terminal is barred from establishing or allowed to establish the bearer of the target service of the service category comprises receiving, by the terminal, the indication information indicating that the terminal is barred from establishing the bearer of the target service from the access network device through the AS of the terminal.

2. The service category congestion control method of claim 1, wherein the terminal is physically separated from the access network device and the core network device.

3. A service category congestion control method, executed by a core network device, the method comprising:
   acquiring service request information, the service request information comprising information corresponding to a request initiated by a terminal which is in a connected mode and has accessed the network device through another service request, the request initiated by the terminal being used for establishing a bearer of a target service and the service request information comprising a service category of the target service;
   acquiring service category barring information in response to the acquiring of the service request information, the service category barring information comprising a barring parameter corresponding to the service category of the target service in the connected mode; and
   judging, according to the barring parameter, whether the terminal is to be barred from establishing the bearer of the target service of the service category,
   wherein the acquiring service request information comprises:
   receiving the service request information sent by a Non-Access Stratum (NAS) of the terminal; and
   wherein the acquiring service category barring information comprises:
   receiving the service category barring information sent by an access network device, the service category barring information comprising multiple service categories and barring parameters corresponding to the multiple service categories respectively.

4. The service category congestion control method according to claim 3, wherein the barring parameter is a barring probability, and the method further comprises:
   acquiring a random number generated by the terminal for the target service; and
   wherein the judging, according to the barring parameter, whether the terminal is to be barred from establishing the bearer of the target service comprises:
   when the random number is smaller than the barring probability, barring the terminal from establishing the bearer of the target service; or
   when the random number is larger than the barring probability, allowing the terminal to establish the bearer of the target service,
   wherein the barring probability is lower than or equal to an access barring probability configured for the service category of the target service in an idle mode.

5. The service category congestion control method according to claim 4, wherein the barring probability is lower than an access barring probability corresponding to the service category of the target service in an idle mode.

6. The service category congestion control method according to claim 3, further comprising:
   when determining that the terminal is barred from establishing the bearer of the target service according to the barring parameter, sending to the NAS of the terminal, by the core network device, seventh indication information indicating that establishment of the bearer of the target service is barred.

7. The service category congestion control method according to claim 3, further comprising:
when determining that the terminal is allowed to establish the bearer of the target service according to the barring parameter, sending to the access network device, by the core network device, eighth indication information indicating that establishment of the bearer of the target service is allowed.

8. The service category congestion control method according to claim 3, wherein the barring parameter is a barring bitmap, and the method further comprises:
acquiring an Access Class (AC) of the terminal; and
wherein the judging, according to the barring parameter, whether the terminal is to be barred from establishing the bearer of the target service of the service category comprises:
when the AC of the terminal is set to be 1 in the barring bitmap, barring the terminal from establishing the bearer of the target service; or
when the AC of the terminal is not set to be 1 in the barring bitmap, allowing the terminal to establish the bearer of the target service.

9. The service category congestion control method according to claim 8, wherein a number of bits set to be 1 in the barring bitmap is smaller than a number of bits set to be 1 in a bitmap corresponding to the service category of the target service in the idle mode.

10. The service category congestion control method of claim 3, wherein the terminal is physically separated from the access network device and the core network device.

11. A service category congestion control terminal, comprising:
a sender, configured to send service request information to a network device, the service request information comprising information corresponding to a request for establishing a bearer of a target service initiated by the service category congestion control terminal which is in a connected mode and has accessed the network device through another service request, and the service request information comprising a service category of the target service; and
a receiver, configured to receive indication information sent by the network device in response to the service request information, the indication information indicating that the service category congestion control terminal is barred from establishing or allowed to establish the bearer of the target service of the service category,
wherein the sender is configured to send the service request information to a core network device through a Non-Access Stratum (NAS) of the service category congestion control terminal; and wherein the receiver is configured to receive indication information indicating that the service category congestion control terminal is allowed to establish the bearer of the target service from an access network device through an Access Stratum (AS) of the service category congestion control terminal;
wherein the sender is configured to send the service request information to the access network device through the AS; and wherein the receiver is configured to receive the indication information indicating that the service category congestion control terminal is barred from establishing the bearer of the target service from the access network device through the AS; or
wherein the sender is configured to send the service request information to the core network device through the NAS; and wherein the receiver is configured to receive the indication information indicating that the service category congestion control terminal is barred from establishing the bearer of the target service from the core network device through the NAS.

12. The service category congestion control method of claim 11, wherein the terminal is physically separated from the access network device and the core network device.

* * * * *